UNITED STATES PATENT OFFICE 2,272,331

METHOD FOR PRODUCING DIELECTRICALLY HIGH-GRADE TITANIUM DIOXIDE

Paul Schupp, Berlin-Siemensstadt, Germany, assignor to "Fides" Gesellschaft für die Verwaltung und Verwertung von gewerblichen Schutzrechten mit beschränkter Haftung, Berlin, Germany, a corporation of Germany No Drawing. Application July 18, 1938, Serial No. 219,925. In Germany July 16, 1937

8 Claims. (Cl. 106—46)

The present invention relates to a method for manufacturing a dielectrically high-grade titanium dioxide of crystalline form.

Of all known metal oxides which possess a relatively high dielectric constant, titanium dioxide is characterized by particularly high values. The crystalline form known as rutile has the highest dielectric constant and is therefore employed to a great extent in the manufacture of electric condensers. However, this material has in practice a relatively high loss angle particularly at low frequencies. The considerable increase of the loss angle with decreasing frequencies is accompanied by a corresponding change in the dielectric constant. This instability of the dielectric properties is disadvantageous to many uses of titanium dioxide as a dielectric.

An object of the present invention is to eliminate this increase of the loss angle at low frequencies. The invention is based on the recognition that this increase is caused by the presence of so-called faulty points in the lattice of the titanium dioxide crystal. At these faulty points the crystals assume to a certain extent the properties of semi-conductors. These faulty points need not extend throughout the entire crystal but may be limited to some localities so that points of relatively good conductivity occur within the otherwise good insulating material, which points are a deciding cause of the poor loss angle. A more particular object of the invention, therefore, is to prevent the formation of such faulty points or to reform already existing faulty points in the crystal lattice of the dioxide.

This is accomplished, according to the invention, by effecting the thermal conversion of the titanium dioxide from the amorphous into the crystalline state, or the subsequent thermal treatment of the crystalline dioxide in an atmosphere which contains oxygen and is substantially free of reducing agents, or by adding to the dioxide such substances which give off oxygen when heated.

The improvement achieved by the invention may be explained as follows. The metal oxides behave differently as to the capability of their electrical coductivity of being influenced by oxygen. Tests have shown that the "reduction semi-conductors" to which titanium dioxide belongs, conduct most poorly if they contain as great an amount of oxygen as possible. Such points in the oxide lattice which increase in number with decreasing percentage of oxygen are the cause of the conductivity. Since a decreasing outer oxygen pressure, according to thermodynamic laws, corresponds to an increasing partial pressure of the metallic component of the oxide and since it must be assumed that the number of the metal atoms embedded in excess in the oxide increases and decreases in proportion to this metallic partial pressure, it may be concluded that the conductivity of the reduction semi-conductors is caused only by an excess in metal and disappears if the excess in metal disappears.

It should be noted that the foregoing explanation, when speaking of an excess in metal and of an enrichment of the oxide with oxygen within the range where the oxygen amount determined the occurrence of locally conductive areas, does not deal with a compounding process resulting in a new oxide phase, but concerns itself only with changes of the relative oxygen content of the crystal lattice within limits where the original oxide phase is maintained.

The method according to the invention may be carried out by heating the amorphous titanium dioxide in a closed chamber simultaneously with pure oxygen. Of course, also other gases may be added to oxygen, provided they do not present any reducing properties. Another way of embodying the invention consists in adding, before the thermal treatment of the titanium dioxide, substances which during the treatment give off oxygen to such an extent that the titanium dioxide is practically always in an oxygen atmosphere. It is not very important whether the substance yields its oxygen below or at the temperature at which the titanium dioxide is converted into the desired crystalline form. It is only necessary that such an admixture be chosen which gives off a sufficient quantity of oxygen at the temperature at which the titanium dioxide is treated. Such oxygen developing substances are, for instance, barium peroxide, and such metal oxides which present besides their most stable oxide phase a more highly oxidized phase unstable at high temperatures. An example of the latter type is antimony pentoxide since it is converted into antimony tetroxide already at a temperature above 400 degrees centigrade, thus giving off oxygen.

The titanium dioxides treated according to the invention may either be employed as an admixture for ceramic substances or in connection with high-grade base substances as dielectrics for electric condensers. The treated titanium dioxides do not present the above-mentioned effect of the increase of the loss angle at low frequencies and are therefore very suitable for electric communication purposes.

Any of the available forms of titanium dioxide, for instance anatase, brookite, rutile and their mixtures may be subjected to the method according to the invention.

What is claimed is:

1. The method of producing a dielectrically high-grade titanium dioxide of crystalline form which comprises subjecting crystallized titanium dioxide to a heat treatment at an elevated temperature promoting the perfection of the crystalline lattice and in an oxygen-rich atmosphere substantially free of reducing agents.

2. The method of producing a dielectrically high-grade titanium dioxide of crystalline form, in particular for the manufacture of condenser dielectrics, which comprises thermally converting amorphous titanium dioxide into crystalline form in contact with an oxygen-rich atmosphere free of reducing agents.

3. The method of producing a dielectrically high-grade titanium dioxide of crystalline form, in particular for the manufacture of condenser dielectrics, which comprises admixing to crystalline titanium dioxide an oxygen-rich substance capable of giving off oxygen at high temperature and subjecting the mixture to a heat treatment at a temperature where oxygen is liberated from said substance.

4. The method of producing a dielectrically high-grade titanium dioxide of crystalline form, in particular for the manufacture of condenser dielectrics, which comprises admixing to amorphous titanium dioxide an oxygen-rich substance capable of giving off oxygen at a high temperature and thermally converting the titanium dioxide in crystalline form at said temperature.

5. The method of producing a dielectrically high-grade titanium dioxide of crystalline form, in particular for the manufacture of condenser dielectrics, which comprises admixing barium peroxide to the titanium dioxide and subjecting the mixture to a heat treatment at an elevated temperature promoting the perfection of the crystalline lattice and in an oxygen-rich atmosphere substantially free of reducing agents.

6. The method of producing a dielectrically high-grade titanium dioxide of crystalline form, in particular for the manufacture of condenser dielectrics, which comprises admixing to titanium dioxide an oxygen-rich metal oxide instable at high temperatures so as to disintegrate into a less oxidized phase under liberation of oxygen, and subjecting said mixture to a heat treatment at a temperature where oxygen is liberated from said substance.

7. The method of producing a dielectrically high-grade titanium dioxide of crystalline form, in particular for the manufacture of condenser dielectrics, which comprises admixing antimony pentoxide to the titanium dioxide and subjecting said mixture to a heat treatment at a temperature above 400° C. where said pentoxide disintegrates under liberation of oxygen.

8. The method of producing a dielectrically high-grade titanium dioxide of crystalline form, in particular for the manufacture of condenser dielectrics, which comprises thermally converting amorphous titanium dioxide into crystalline form in a closed heating chamber and in contact with pure oxygen.

PAUL SCHUPP.